Sept. 24, 1968 F. C. BRESK ET AL 3,402,593
APPARATUS AND METHODS FOR SELECTIVELY PROGRAMMING
DIFFERENT TYPES OF SHOCK TESTS
Filed May 24, 1966 5 Sheets-Sheet 1

INVENTORS
FRANK C. BRESK
ROBERT P. GRAY
JOHN O. BEAL

BY

Leon F. Herbert
ATTORNEY

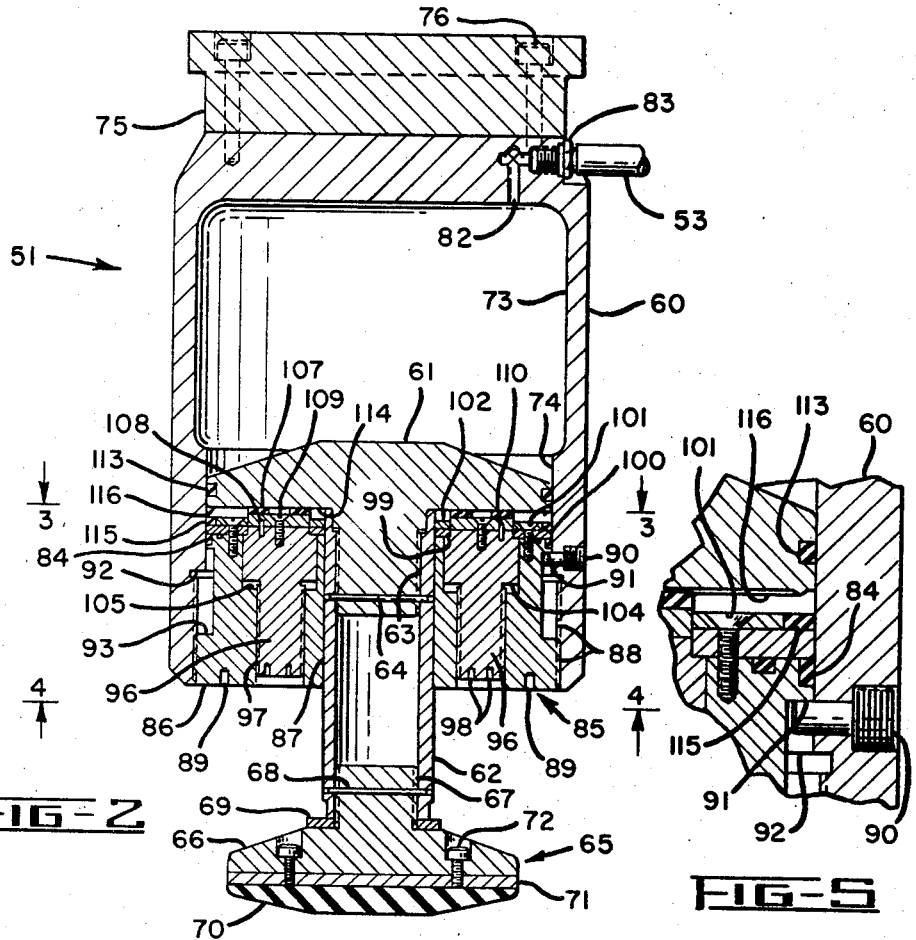
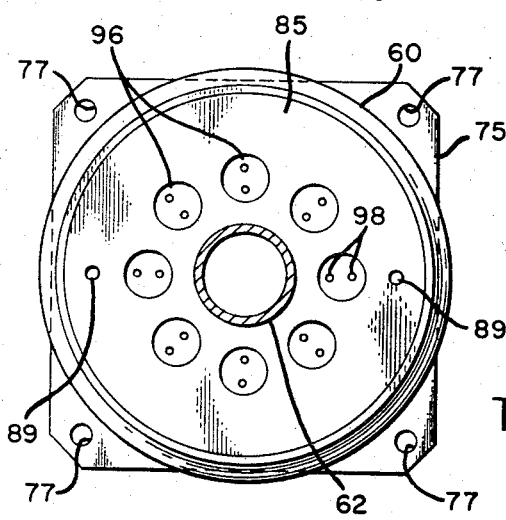
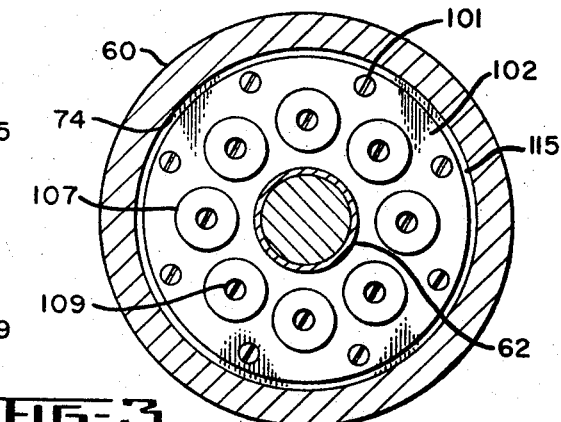

INVENTORS
FRANK C. BRESK
ROBERT P. GRAY
JOHN O. BEAL

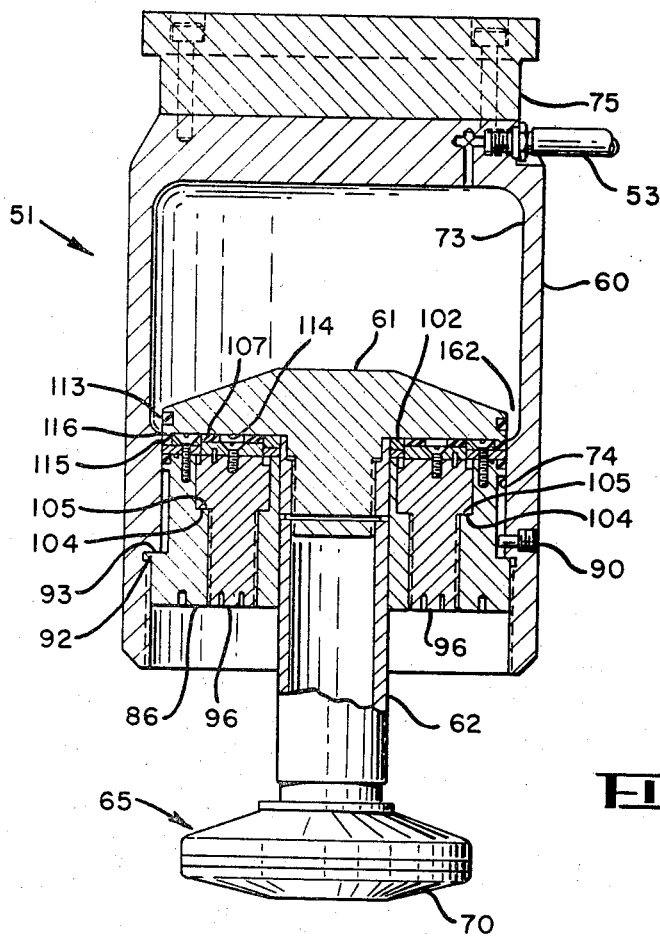
FIG-12
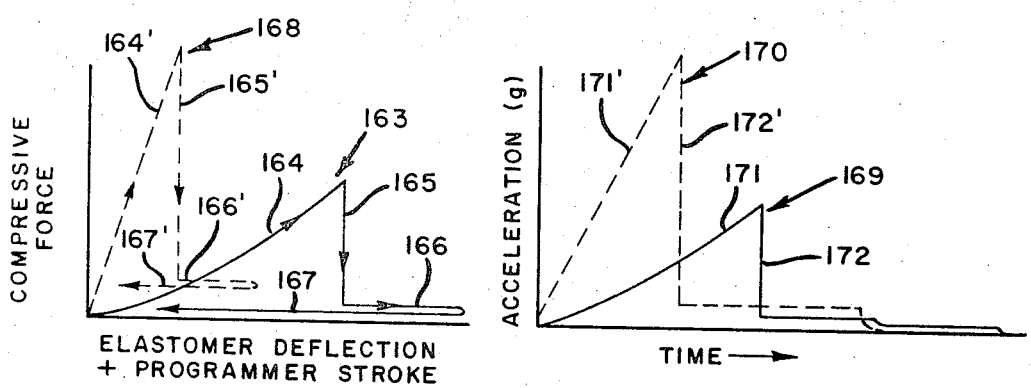
FIG-13
FIG-14

INVENTORS
FRANK C. BRESK
ROBERT P. GRAY
JOHN O. BEAL

BY Leon F. Herbert
ATTORNEY

United States Patent Office

3,402,593
Patented Sept. 24, 1968

3,402,593
APPARATUS AND METHODS FOR SELECTIVELY PROGRAMMING DIFFERENT TYPES OF SHOCK TESTS
Frank C. Bresk, Carmel Valley, Robert P. Gray, Monterey, and John O. Beal, Carmel Valley, Calif., assignors to Monterey Research Laboratory, Inc., Monterey, Calif., a corporation of California
Filed May 24, 1966, Ser. No. 552,511
19 Claims. (Cl. 73—12)

ABSTRACT OF THE DISCLOSURE

The shock testing apparatus of the present invention comprises a movable table and means for moving the table toward a reaction mass. The programmer construction comprises both a gas filled cylinder and piston unit, an an elastomer unit. The two programmer units are positioned in series between the movable table and the reaction mass so that both of the units can contribute to the formation of a shock pulse. The gas filled cylinder and piston unit controls the type of pulse shape. The cylinder for obtaining all of the various shock pulses has different inside diameter portions, and means are provided for adjusting the position of the piston in the cylinder prior to performing a desired shock test. In addition thereto, means are provided for adjusting the precharge pressure in the cylinder. These adjustments provide the means for obtaining a desired pulse shape. The elastomer unit cooperates with the cylinder and piston unit, and is further adjustable as to thickness and hardness. The adjustment of the elastomer unit is primarily to vary the duration of the shock pulse and does not vary the basic type of pulse.

---

This invention relates to the field of shock testing and more particularly to shock testing under conditions requiring a variety of different shock pulses.

Shock testing apparatus of the type under consideration conventionally comprises a movable table for carrying a test specimen, a relatively stationary reaction mass, and means guiding the table for movement toward the reaction mass, either under the force of gravity or by powered driving means. A shock programmer is placed between the table and reaction mass to program the specific type of shock pulse desired for the shock test. As is customary in the art, the shock pulse is defined as the plot of acceleration of the table against time as the programmer is compressed between the table and the reaction mass. The type of shock programmer which is employed determines the shape of the shock pulse.

In the field of shock testing there are a variety of required shock pulses referred to generally as half sine pulses, sawtooth pulses, square wave pulses, and a version of the square wave pulse termed a trapezoidal pulse. The shock programmers employed prior to this invention have required that a substantially different programmer be used for each of the aforementioned specific shock pulses.

It is an object of the present invention to provide shock programming apparatus which is adjustable to obtain all of the aforementioned shock pulses.

Another object of the invention is to provide shock programming apparatus which is not only adjustable to obtain a variety of shock pulse shapes but which is operable to vary the duration of the pulse and the peak acceleration of the pulse.

An additional object of the invention is to provide an alternate embodiment of the programming apparatus which has a simplified construction and yet will provide two of the mentioned shock pulses; namely, the half sine and sawtooth pulses.

A further object of the invention is to provide methods of operating the adjustable programming apparatus to obtain the desired variations of pulse shape, duration and peak acceleration.

By way of brief description shock testing apparatus according to the invention comprises a movable table and means for moving the table toward a reaction mass. The programmer construction comprises both a gas filled cylinder and piston unit, and an elastomer unit. The two programmer units are positioned in series between the movable table and the reaction mass so that both of the units can contribute to the formation of the shock pulse. The gas filled cylinder and piston unit controls the type of pulse shape. The cylinder for obtaining all of the mentioned shock pulses has different inside diameter portions, and means are provided for adjusting the position of the piston in the cylinder prior to performing a desired shock test. In addition means are provided for adjusting the precharge pressure in the cylinder. The adjustments provide the means for obtaining a desired pulse shape. The elastomer unit cooperates with the cylinder and piston unit, and is further adjustable as to thickness and hardness. However, adjustment of the elastomer unit is primarily to vary the duration of the pulse, and does not vary the basic type of pulse. The simplified cylinder construction for obtaining only the half sine and sawtooth pulses has a single inside diameter and does not require means for adjusting the piston position.

The various objects and features of advantage, together with the preferred specific construction and operation, will become apparent from the following detailed description, wherein reference is made to the accompanying drawings in which:

FIGURE 2 is a cross section view on enlarged scale showing the details of the cylinder and piston programmer unit for obtaining all of the mentioned shock pulses, and showing the unit adjusted for obtaining half sine pulses or square wave pulses, depending on the precharge pressure in the cylinder;

FIGURE 3 is a cross sectional view on the line 3—3 of FIGURE 2 showing the inner face of the closure member on the end of cylinder;

FIGURE 4 is a view of the bottom of the cylinder taken on the line 4—4 of FIGURE 2;

FIGURE 5 is an enlarged sectional view of a portion of FIGURE 2 showing a seal between the bottom of the piston and the end of the cylinder;

FIGURE 12 is a cross section view of the cylinder and piston unit of FIGURE 2 but showing the unit adjusted for obtaining saw tooth pulses or half sine pulses depending on the precharge pressure in the cylinder;

FIGURE 13 is a force versus deflection diagram or spring rate for the programmer adjusted as in FIGURE 12 and precharged with a gas pressure which will result in a sawtooth pulse;

FIGURE 14 is an acceleration versus time or pulse diagram showing the sawtooth pulses resulting from the spring rates in FIGURE 13;

Figure 1:
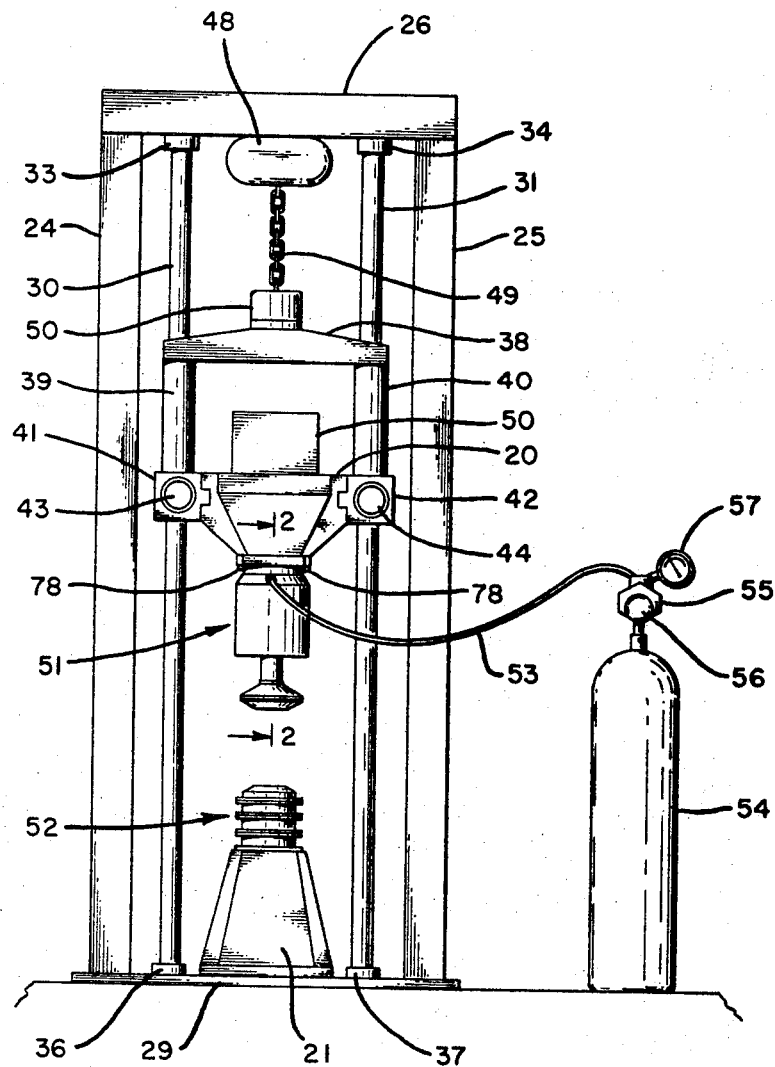
FIGURE 1 is a front elevational view of the shock testing apparatus including a drop test machine, the cylinder and piston programmer unit, the elastomer programer unit, and the adjustable gas source.

Referring to the drawings in more detail, FIGURE 1 shows a testing machine comprising a metal drop table 20 and a metal reaction mass 21. It will be noted that the reference numbers start with the number 20 in order to avoid any confusion between the figure numbers and the reference numbers. The drop table and reaction mass both have a shape in the general form of a four-sided pyramid with the edges of the pyramid being chamferred. The construction of the testing machine is not claimed per se as part of the present invention, but the testing machine is interrelated to the programming system and performs a function in the complete operation of the system. The machine has an inverted U-shaped frame with vertical metal side posts 24 and 25 and a connecting metal top piece 26. Side posts 24 and 25 are welded to a metal base plate 29.

The drop table 20 runs on a pair of metal guide posts 30 and 31 which are circular in cross section. The tops of the guide posts are attached to top piece 26 by means of metal collars 33 and 34 and to the base plate 29 by means of metal collars 36 and 37. The structure for elevating and stopping the drop table includes a metal lifting yoke 38 attached to a pair of metal guide sleeves 39 and 40. The bottom ends of sleeves 39 and 40 carry metal guide journals 41 and 42, respectively, which are bolted to and support the drop table 20. Each of the guide journals includes a pair of conventional air brakes 43 and 44 which operate to force brake shoes (not shown) against guide posts 30 and 31 in well known manner. Solenoid valve controlled air lines (not shown) serve to energize the brakes after table 20 has rebounded upwardly following a completed shock pulse, as is well known in the art. An electric motor hoist 48 is bolted to the frame top piece 26. The hoist 48 is connected by a chain 49 to a lifting and release magnet 50 which is operated by a conventional switch (not shown) to release the lifting yoke 38 when it is desired to have the table 20 fall for a test pulse. The falling package includes the table 20, structure 38–40, a test specimen 50, and any programmer which is attached to the under side of the drop table as will be hereinafter described in detail.

In order to program a drop test in accordance with the invention, a cylinder and piston programmer unit 51 and an elastomer programmer unit 52 are interposed between the drop table 20 and the reaction mass 21. The cylinder and piston unit 51 is preferably attached to the drop table and the elastomer unit 52 is preferrably attached to the reaction mass. However, it is possible to obtain similar programming results by attaching the cylinder and piston unit to the reaction mass and the elastomer unit to the drop table.

As will be apparent in detail from the description of FIGURE 2 hereinafter, the cylinder portion of the programmer 51 is connected to a flexible high pressure line 53. The line 53 is connected to a conventional source of gas under high pressure. For example, the source can be a metal bottle 54 of nitrogen gas under a pressure of about 2000 pounds per square inch. The important point is that the pressure in bottle 54 must be high enough to pressurize the programmer 51 with the highest pressure which will be required for testing. The function of the pressure in programmer 51 will be explained in connection with the operation of the apparatus. In order to be able to adjust the pressure in the programmer 51, a conventional pressure regulator 55 is mounted in the outlet end of the gas bottle 54 so that the gas passes through regulator 55 into the line 53. The regulator is provided with a control knob 56 by which the pressure reaching the programmer 51 can be easily controlled. In order to know the pressure in the programmer 51, a conventional pressure gauge 57 is connected to the outlet side of the regulator to indicate the pressure in line 53 and therefore the pressure in programmer 51. FIGURE 1 shows the gas bottle 54 standing on the floor beside the drop test machine. An alternative arrangement is to house the gas bottle in a control panel which can be stationed adjacent the drop test machine. The important point is that the high pressure line 53 be long enough to permit the programmer 51 to move with the drop table 20 between the maximum upper and lower limits of travel of the drop table.

The details of the cylinder and piston unit 51 will now be described with particular reference to FIGURES 2–5. The unit comprises a metal cylinder 60, and a metal piston 61 received in the cylinder. A tubular metal piston rod 62 is secured to the piston by means of threads 63 and a metal pin 64. A circular impact head 65 is attached to the outer end of the piston rod 62. The impact head comprises a metal block 66 which is secured to the piston rod by threads and a metal pin 68, with a metal spacing ring 69 preferably positioned between the block 66 and the end of piston rod. The outer face of the impact head is made of a circular disk 70 of elastomer materials such as hard rubber. The elastomer disk 70 is bonded to a metal backing plate 71 and secured in placed by means of screws 72.

The cylinder 60 has an inside wall portion 73 of relatively large diameter located in the upper part of the cylinder, and an adjacent wall portion 74 of smaller diameter for purposes which will be hereinafter described. A metal mounting block 75 is secured to the upper end of the cylinder 60 by means of screws 76. The upper end of the mounting block 75 is preferably rectangular, as shown in FIGURE 4, so that at its four corners four mounting holes 77 can be provided. The cylinder and piston unit is attached to the bottom of the drop table 20 by means of bolts 78 which pass through the holes 77 and are threaded into the bottom of the drop table as indicated in FIGURE 1. It is desirable to insert a thin elastomer pad (not shown) between the cylinder unit and the drop table to avoid metal-to-metal contact. The upper end of the cylinder 60 is provided with an inlet passage 82 in which is threaded a conventional attachment fitting 83 for connecting the flexible high pressure line 53 to the inside of the cylinder.

The lower end of the cylinder is closed by an adjustable end wall structure 85. The end wall structure comprises a circular metal member or block 86 which is centrally apertured at 87 to receive the piston rod 62. The end wall portion 86 is held in place by threads 88 so that by rotating the member 86 it can be moved inwardly and outwardly relative to the cylinder 60. Wall portion 86 preferably carries a hard rubber sealing ring 84. In order to provide means for rotating the member 86, its outer face is provided with at least two bores 89 so that a spanner wrench can be employed for turning the member 86. The spanner wrench (not shown) is of usual construction having two long studs thereon and arranged so that the studs will fit into the bores 89. As shown in FIGURE 2, the end wall member 86 is in its outermost position. In order to fix the outermost position in a positive manner, an abutment screw 90 is threaded into the side of cylinder 60 and engages an abutment rim 91 on the inner end of the member 86. In order to provide the maximum inner position of end wall member 86 in a positive manner, the inner wall of cylinder 60 is provided with an abutment rim 92 which will engage an abutment rim 93 on the wall member 86. The inner position of wall member 86 as set by the abutment rims 92 and 93 can be seen in FIGURE 12.

The end wall structure comprises in addition to the end wall member 86 a plurality of metal plugs 96 which are adjustably received in the wall member 86. As shown in FIGURE 4 there are preferably eight such plugs 96. The wall member 86 is drilled to receive the plugs 96 with a close sliding seal, and the plugs are adjustably held in place by means of threads 97. As in the case of the wall member 86, the plugs 96 are each provided with two bores 98 for cooperation with a spanner wrench. In order to provide the inward stop position for the plugs 96 as shown in FIGURE 2, the plugs are provided with abutment shoulder 99 which engage a metal abutment ring 100 that is held in place by screws 101 which pass through an overlying metal ring 102. Each of the rings 100 and 102 of course contains eight apertures to receive the upper ends of plugs 96. In order to provide a positive stop for the outer position of plugs 96, each of the plugs is provided with an abutment shoulder 104 which can engage an abutment shoulder 105 on the end wall member 86. The outermost position of plugs 96 relative to wall member 86 can be seen in FIGURE 12.

The inner end of each plug 96 is provided with a cushion disk 107 of elastomer material such as hard rubber. Each of the cushion disks is bonded to a metal backing disk 108 which is secured to the upper end of its respective plug 96 by means of a screw 109. Both of the disks 107 and 108 are centrally apertured to receive the screw 109, and the head of the screw is positioned well below the upper surface of the cushion disk 107. In order to prevent the backing disk 108 from turning and thus accidentally loosing screw 109, a locking pin 110 is positioned in each of the backing disks 108 and its respective plug 96.

The relation between the piston 61 and the cylinder 60, and the relation between the piston and the end wall structure 85 will now be described. The rim of the piston is recessed to receive a sealing ring 113 of a material such as hard rubber so that the piston 61 has a gas-tight sliding seal in the small diameter portion 74 of the cylinder 60. In addition to the peripheral seal 113, provision is also made for sealing the outer face 114 of the piston. The face seal comprises a sealing ring 115 of a material such as hard rubber bonded to the metal ring 100 which is attached to the end wall member 86. In addition, the face 114 of the piston is provided with a small annular ridge 116 projecting downwardly to assure good contact with the sealing ring 115 to form a gas-tight seal. It should be noted that there is no sealing structure between the piston rod 62 and the aperture 87 in the end wall member 86. The reason for this is to allow gas which is trapped below the face of the piston radially inward of the face seal 115 to escape to atmosphere along the path formed between the piston rod 62 and the aperture 87 for reasons which will be hereinafter described in connection with operation of the apparatus. More specifically the escape passage is formed by making the piston rod with an outer diameter of 1.500 inches and the aperture 87 with an inner diameter of 1.502 inches. If a larger piston rod diameter were employed the clearance between it and aperture 87 would not need to be as great in order to have the same total cross section of escape passage. Similarly if the piston rod were smaller the clearance should be slightly larger. The escape passage could of course be formed in other ways through the end wall structure 85, and some gas may escape along the plugs 96 as well as along the piston rod. The point is that a restricted escape passage radially inward of sealing ridge 116 is essential for sawtooth operation. The size of the passage is not critical as long as it is large enough to permit the pressure on the outer face 114 of the piston to drop to approximately atmospheric pressure in a relatively short length of time to permit rapid repetition of sawtooth tests, and as long as it is small enough to prevent the loss of too much gas from the cylinder after the piston lifts off of the face seal 115 during a sawtooth pulse as will be described in connection with FIGURE 12. In the preferred construction, the escape passage permits the pressure on the outer face of the piston to drop to approximately atmospheric pressure in about fifteen seconds after the sealing ridge 116 seats on the sealing ring 115.

At this stage of the description it should be understood that the outer face 114 of the piston can be seated either on the cushion disks 107 or on the face seal 115 simply by adjusting the plugs 96 inwardly or outwardly, respectively. Similarly it should be understood that the piston can be located either in the small diameter portion 74 of cylinder 60 or in the large diameter portion 73 simply by adjusting the end wall member 86 to its outer position or its inner position, respectively.

Figure 7:
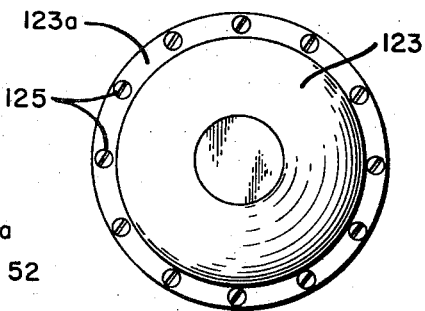
FIGURE 7 is a top view of the elastomer programmer unit as seen from line 7—7 in FIGURE 6.
Figure 6:
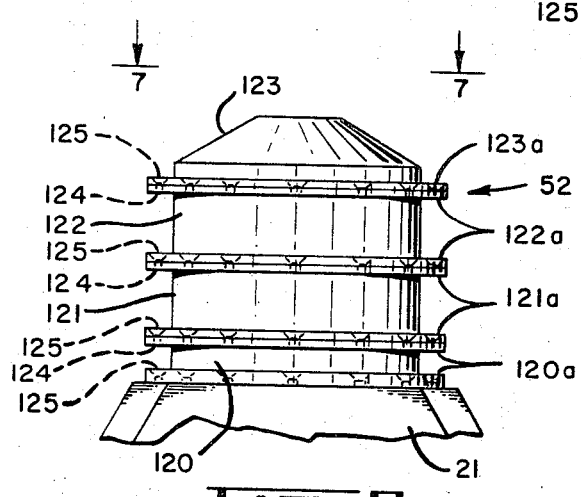
FIGURE 6 is a side elevational view on enlarged scale showing a representative arrangement of the elastomer programmer unit of FIGURE 1.

The elastomer programmer unit 52 will now be described, and for this purpose reference is made to FIGURES 6 and 7. The elastomer programmer 52 comprises a plurality of elastomer disks 120, 121, 122 and 123 of a material such as natural rubber. Each of the disks 120, 121, 122 is provided on each side with a metal mounting disk indicated respectively at 120a, 121a, and 122a. The top elastomer disk 123 has a metal mounting disk 123a only on its lower surface so that the impact between the cylinder unit 58 and the elastomer unit 52 will be an elastomer-to-elastomer contact. The metal disks are permanently attached to their respective elastomer disks by vulcanizing or other bonding process. The upper mounting disk on each elastomer disk is drilled and threaded as indicated at 124, and the lower mounting disk on each elastomer disk is drilled (without threads) and counterbored to receive connecting screws 125. The lower mounting disk on the bottom elastomer disk 120 is attached to the reaction mass 21 which has threaded holes to receive the screws 125. The elastomer disks are provided in a variety of different thickness and different hardness. Thus, it is possible to remove one or more of the elastomer disks or add additional disks, or replace disks with others of different thickness or hardness to obtain a specific desired spring rate curve for the elastomer programmer unit. Elastomer programmers have been used prior to this invention and are not claimed, per se, but only with the cylinder and piston programmer unit to make a programming system which will provide the stated variety of shock pulse shapes.

*Operation*

An operating cycle of the machine will now be described. The specimen 50 to be tested is bolted to the top of the drop table 20 under yoke 38. As is conventional in the art, the top surface of the table can be provided with an array of threaded holes (not shown) for the purpose of attaching variously shaped test specimens. Weights may also be added to the top of table 20 to obtain a specific drop package weight. Loading of the table can take place in a lowered position with programmer 51 resting on the programmer 52, or the table can be loaded at some elevated location with the brakes 43, 44 in the "on" position. In the latter event it is sometimes conventional to employ a positive latching arrangement (not shown) to prevent the table from falling in the event of failure of air pressure supply to the brake system. In either case, after the table is loaded the magnet 50 is energized to grip the yoke 38, and the brakes and/or latch mechanism is released. The electric hoist 48 is then energized to raise the drop table to the height desired for the specific test. After the table, with test specimen and any required weights, is elevated to the desired drop height, the magnet 50 is deenergized and the table falls freely under the force of gravity. At the bottom of the fall the impact head 65 on the programmer 51 strikes the top disk 123 on the elastomer unit 52.

Half sine pulses

In order to obtain a half sine pulse with the described programming structure, the precharge pressure in cylinder 60 is adjusted to be high enough that the force of the gas pressure acting on the area of the top of piston 61 is greater than the force of the drop impact. In this way the cylinder and piston assembly remains locked throughout the drop test, and the shock pulse is programmed entirely by the elastomer programmer unit 52. The piston 61 can be positioned in cylinder 60 in a number of ways for obtaining the half sine pulse, as long as the piston is sealed by one or both of seals 113 and 115 so that the pressure in cylinder 60 acts only on the top of the piston. In one arrangement, the piston is positioned in the small diameter portion 74 of the cylinder as shown in FIGURE 2 so that sealing ring 113 will be effective. Such positioning is of course accomplished by adjusting the end wall member 86 outwardly as previously described. The piston can either be raised up off of sealing ring 115 by the cushion disks 107 as in FIGURE 2, or the plugs 96 can be adjusted outwardly so that the piston seals against ring 115 as well as being sealed by ring 113. Alternatively, the piston can be positioned in the large diameter portion 73 as shown in FIGURE 12, but in that case the cushion disks 107 must be adjusted outwardly to permit the piston to be sealed against the sealing ring 115.

Figure 8:
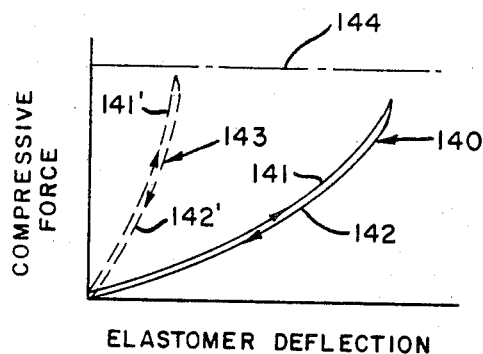
FIGURE 8 is a force versus deflection diagram or spring rate for the programmer adjusted as in FIGURE 2 and precharged with sufficiently high gas pressure to provide a half sine pulse.

After the cylinder and piston unit 51 is properly precharged and adjusted as previously described, the drop table with a test specimen mounted thereon, is raised to the desired height and then released as previously described. When the impact head 65 strikes the elastomer programmer unit, a spring curve of force versus deflection as shown in FIGURE 8 results from the action of the elastomer unit 52. The solid line curve 140 in FIGURE 8 results from a relatively soft arrangement of the elastomer unit 52. A soft arrangement is accomplished by using elastomer disks 120–123 of relatively soft rubber or using more or thicker elastomer disks. Conversely, the elastomer unit 52 can be stiffened by using harder elastomer disks, or fewer or thinner disks. In curve 140, the portion 141 represent the force versus deflection as the impact head 65 moves downwardly to compress the elastomer unit, and the portion 142 represents the force versus deflection as the elastomer unit 52 rebounds to move the impact head and drop table back up. The dash-line 143 in FIGURE 8 is a curve similar to curve 140 but showing the spring rate which results from a stiffer arrangement of the elastomer unit than was used to obtain curve 140. In curve 143 the up and down leg portions are similar to portions 141 and 142 of curve 140 and are designated with primed reference numbers.

The dot-dash line 144 in FIGURE 8 represents the outward force exerted by the gas in cylinder 60 acting on the top of piston 61. Since the maximum inward force exerted on the piston by the drop, as represented by the top of curves 140 and 143 is less than the outward force, the piston remains locked in cylinder 60. In other words the piston does not move relative to the cylinder during the drop test. If the weight of the test specimen and/or the drop height are substantially increased so that the top of curves 140 and 143 would be above line 144, the precharge pressure must be increased to maintain line 144 above the top of the resulting higher spring curve.

Figure 9:
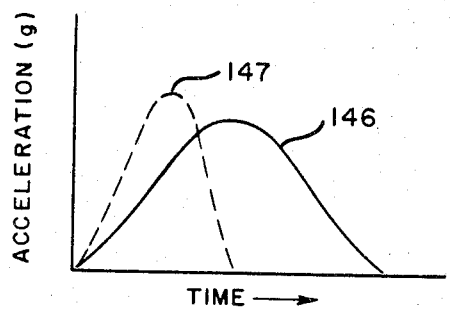
FIGURE 9 is an acceleration versus time or pulse diagram showing the half sine pulses resulting from the spring rates in FIGURE 8.

As is well known by those skilled in the art, a substantially straight spring rate as shown by line 140 in FIGURE 8, results in a half sine shock pulse of acceleration versus time, as shown by curve 146 in FIGURE 9. It should be noted that the term "acceleration" is used herein to define change in table velocity upon and after impact, including both the initial deceleration in the downward movement of the table and the following upward acceleration of the table when it stops moving down and is accelerated upwardly upon rebound. The dash line 147 in FIGURE 9 is the half sine pulse which results from the spring rate 143 in FIGURE 8. Thus, it will be understood that the duration of the half sine pulse can be adjusted by changing the stiffness of the elastomer programmer 52. More specifically, the duration can be increased by using a relatively soft elastomer programmer as shown by lines 140 and 146, and the duration can be decreased by using a stiffer elastomer programmer as shown by lines 143 and 147. As is known by those skilled in the art, the peak acceleration for a given drop package weight can be adjusted by changing the drop height. More specifically, increasing the drop height increases the peak acceleration.

Square wave type pulses

In order to obtain a square wave type pulse with the described programming structure, the piston 61 is arranged as shown in FIGURE 2. More specifically, the piston is positioned in the smaller diameter portion 74 of the cylinder 60 so that the sealing ring 113 will be in contact with the cylinder wall. This is accomplished by unscrewing the end wall member 86 outwardly to its outer stop position as fixed by the stop screw 90. In addition the plugs 96 are screwed inwardly to their inner stop position fixed by the abutment shoulders 99 and the abutment ring 100. In this way the outer face 114 of the piston is seated on the elastomer disks 107. As will be hereinafter described the piston strokes inwardly and then rebounds outwardly during the square wave type pulse, and the reason for having the piston seat on the elastomer cushion disks or pads 107 is to prevent distortion of the pulse shape which would occur if the metal piston bottomed out against a metal surface of the end wall structure 85.

Assuming the piston is arranged as previously described, the square wave type pulse is produced when the precharge pressure and drop height are set so that the table is still moving downwardly when the elastomer programmer force builds up to equal the precharge pressure on the upper surface of the piston. The piston then strokes into the cylinder until the downward velocity of the drop table 20 equals zero, and then the gas pressure on the piston pushes the piston outwardly with approximately with the same force to move the table upwardly. The gas pressure in the cylinder 60 acting on the upper surface of the piston 61 remains substantially constant during the inward movement of the piston because the gas volume above the piston in cylinder 60 is relatively large compared to the change in volume caused by the small inward movement of the piston. When the piston moves outwardly under the force of the precharge pressure, it contacts the elastomer cushion disks 107 and is held in contact therewith by the precharge pressure. After the piston contacts the cushion disks 107, the elastomer programmer 52 expands and the acceleration decays to zero. For square wave type pulses, the precharge pressure, drop height, and weight of the programmer package are so selected that the inward stroke of the piston 61 is not sufficient to move the sealing ring 113 out of the small diameter portion 74. The reasons for avoiding this occurance are that the sealing ring 113 could be damaged and because the pulse shape would be distorted if the precharge pressure were allowed to pass around the seal 113 and act upon the outer face 114 of the piston.

Figure 10:
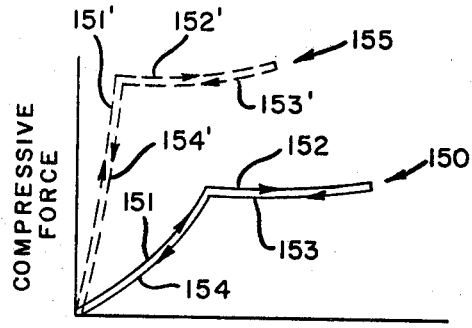
FIGURE 10 is a force versus deflection diagram or spring rate for the programmer adjusted as in FIGURE 2 and precharged with a gas pressure which will result in a square wave pulse.

The combined action of the cylinder and piston programming unit 51 and the elastomer programming unit 52 during a square wave type pulse will now be described with reference to the spring curve shown by the solid line 150 in FIGURE 10. The drop table 20 with a test specimen thereon is raised to the desired drop height and then released. The table free falls until the impact head 65 on the cylinder unit 51 impacts on the elastomer programmer unit 52. At this time the force is not sufficient to move the piston inwardly against the precharge pressure, and as the drop table moves downwardly it first compresses the elastomer programmer 52 to provide the leg 151 of the spring curve. When the force builds up to equal the force of the precharge pressure acting on the top of piston 61, the piston strokes inwardly to provide the leg 152 of the spring curve 150. When the downward movement of the drop table equals zero the precharge pressure forces the piston outwardly to provide the leg 153 of the spring curve. Then when the piston engages the cushion disks 107, the elastomer programmer 52 expands to provide the leg 154 of the spring curve. The spring curve 155 shown in dash lines in FIGURE 10 is accomplished by using a stiffer elastomer programmer than was used for the spring curve 150 and by using a higher precharge pressure. However, the general actions of the elastomer programmer and the cylinder and piston programmer are the same for curve 155 as was explained for curve 150. The leg portions of curve 155 which are similar to those for curve 150 are designated with primed reference numbers.

Figure 11:
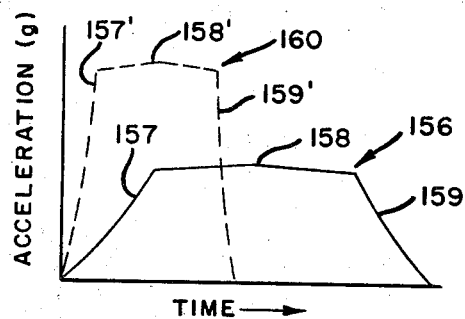
FIGURE 11 is an acceleration versus time or pulse diagram showing the square wave type pulses resulting from the spring rates in FIGURE 10.

As will be understood by those skilled in the art the spring curve 150 results in a shock pulse as shown by the solid line 156 in FIGURE 11. More specifically, the rise leg 157 of the shock pulse is provided by the elastomer programmer leg 151 of the spring curve; the relatively flat dwell portion 158 of the shock pulse is provided by the cylinder and piston programmer legs 152 and 153 of the spring curve; and the decay portion 159 of the shock pulse is provided by the elastomer programmer rebound leg 154 of the spring curve 150. Similarly, the spring curve 155 in FIGURE 10 results in the shock pulse shown by the dash line 160 in FIGURE 11. The various portions of the pulse 160 are similar to those described for the pulse 156 and are identified by primed reference numbers. In the terminology of the art a shock pulse is considered a trapezoidal type of square wave when the time for the rise leg 157 and the decay leg 159 each is a substantial portion of the dwell time 158. Thus in FIGURE 11 the shock pulse 156 can properly be considered a trapezoidal type of square wave and the shock pulse 160 can be considered a true square wave.

The various parameters that can be varied to modify the specific shapes of square wave type pulses will now be described in detail. The magnitude of the dwell portion 158, 158′ of the square wave type pulse is a function of the precharge gas pressure in the programmer cylinder 60. More specifically, the higher the precharge pressure, the higher will be the magnitude of the dwell portion because the piston 61 will not begin to stroke inwardly until a higher compressive force is reached. The duration of the dwell portion is a function of the impact velocity, which in the case of a free fall drop table is determined solely by the drop height. More specifically, a high drop height which results in a high impact velocity causes a long duration dwell portion 158. As previously stated, the time required for the rise leg 157, 157′, and the time required for the decay leg 159, 159′ is in each case simply a function of the stiffness of the elastomer programmer 52. More specifically a stiffer elastomer programmer results in shorter rise and decay times. Since the complete shock pulse 156 for example in FIGURE 11 is a function of the combined effects of the cylinder and piston programmer and the elastomer programmer, it is natural that increasing the rise and decay times tends to shorten the dwell time. Therefore, if it is desired to maintain a given dwell time and increase the rise and decay times it is necessary to increase the drop height.

As was briefly mentioned before it is important that the various parameters be so selected that the piston sealing ring 113 does not move out of the small diameter portion 74 of the cylinder during the square wave type pulse. More specifically, the parameters which effect the extent of inward movement of the piston 61 are the drop height, the weight of the drop package and the precharge pressure. Increasing the drop height or the package weight increases the inward movement of the piston, and conversely increasing the precharge pressure decreases the inward movement of the piston. It is of course simply a matter of conventional calculations or experiments to prepare charts or graphs for a cylinder and piston unit having a given piston diameter to establish the various relations of the mentioned parameters which will result in permissible amounts of inward movement of the piston.

*Sawtooth pulses*

In order to obtain sawtooth pulses with the described programming structure, the piston 61 is first arranged as shown in FIGURE 12. More specifically the end member 86 is screwed upwardly into the cylinder 60 until the abutment shoulder 93 engages the abutment shoulder 92. Ths moves the entire piston up into the large diameter portion 73 of the cylinder so that there is a large unrestricted annular path 162 around the side of the piston. In addition to screwing the end wall inwardly, the plugs 96 are screwed outwardly until the abutment shoulders 104 engage the abutment shoulders 105. This permits the piston, and more specifically the ridge 116 on the piston, to seal against the face seal 115. After the cylinder and piston unit has been adjusted as shown in FIGURE 12, the drop table 20 is raised to the desired height and then released as previously described. When the impact head 65 on the end of the piston rod impacts upon the elastomer programmer 52, the result is a spring curve as shown in FIGURE 13.

The solid line spring curve 163 of FIGURE 13 will now be described in detail. The first action which occurs on impact is that the elastomer programmer 52 compresses to provide the spring leg 164. After the compressive force of the elastomer programmer reaches the magnitude of the force of the precharge pressure acting on the upper surface of the piston 61, the piston moves inwardly and breaks away from the face seal 115. At the instant this occurs the precharge gas in the cylinder 60 flows across the side of the piston and acts against the outer face 114 of the piston. It will be understood that before the piston breaks away from the face seal, the gas force pushing the piston outwardly is the product of the unit gas pressure in cylinder 60 times the total projected area of the upper face of the piston; or in other words the total force is unit gas pressure times the total cross section area of the piston measured in a plane normal to the axis of the piston rod. When the piston breaks away from the face seal, however, the outward force becomes only the unit gas pressure in cylinder 60 times the cross section area of the piston rod 62. The reason of course is that after break away the gas pressure is the same on both the inner and outer faces of the piston except for the area of the piston rod. Thus it is important that the cross sectional area of the piston rod be substantially smaller than the cross section area of the piston. In a preferred embodiment the cross section area of the piston rod is only about ten percent of the cross section area of the piston. It is of course important that the face seal 115 be positioned as close as possible to the rim of the piston in order to achieve maximum change in effective piston area when the piston breaks away from the face seal. The sudden decrease in force on the piston upon breakaway is also enhanced by the fact that the outer face of the piston is vented to atmosphere by the leakage vent around the piston rod so that there will be no possibility of some precharge pressure acting on the outer face of the piston prior to breakaway. It is further important in obtaining maximum change in force on the piston upon breakaway to have the outer face of the piston substantially coplanar with the top of the end wall structure 85, so that there will not be any appreciable volume below the outer face of the piston to bring up to precharge pressure upon breakaway. The result of the described construction is to cause the outward force on the piston, and therefore the force on the drop table, to decay to about ten percent of the peak force of leg 164 in about one millisecond or less when the piston breaks away from the face seal, as shown by the spring leg 165. The piston then stokes inwardly on the low force leg 166 until the velocity of the drop table reaches zero. Then the piston stokes outwardly and the elastomer programmer expands to provide the spring leg 167. The dash line spring curve 168 in FIGURE 13 is obtained by employing a stiffer elastomer programmer 52 and a higher precharge pressure than was the case for the solid line curve 163. The various legs of the spring curve 168 are similar to those described for curve 163 and are identified by primed reference numbers.

As is well known by those skilled in the art the spring curve 163 in FIGURE 13 will result in a shock pulse 169 as shown in FIGURE 14. Similarly the spring curve 168 will result in a shock pulse 170, and obviously both of the pulses 169 and 170 are sawtooth shaped pulses. In the case of the sawtooth pulses shown in FIGURE 14, the peak acceleration is a function of the precharge pressure. More specifically higher precharge pressure results in higher peak acceleration. The rise time to the peak acceleration as shown by legs 171 and 171' in FIGURE 14 is a function of the stiffness of the elastomer programmer 52 and the drop height. A stiffer elastomer programmer results in a decrease in the rise time, and a higher drop height also results in a decrease in the rise time. The substantially vertical decay of the pulse as shown by legs 172 and 172' is a result of the piston breaking away from the face seal 115. It will be recalled that since there is a restricted escape passage formed by aperture 87, the pressure on the outer face of the piston drops to about atmospheric pressure soon after the piston strokes outwardly and reseats on seal 115 so that sawtooth pulses can be quickly repeated. Since the escape passage is a restricted passage and since the time from breakaway to reseating on seal 115 is extremely short, the amount of gas lost after breakaway is negligible.

As previously discussed, the time required for the decay portion of the pulse is dependent only on the time required for the pressure on the outer face of the piston to build up to the pressure on the inner face of the piston after the piston breaks away from the face seal. The decay time is not dependent on the stiffness of the reaction mass as it has been in the case of using crushable lead cones as sawtooth programmers, as was customary prior to the present invention. Thus very fast decay times can be achieved with the programmer described herein even when the base of the machine is not very rigid or is quite compliant.

As will be understood by those skilled in the art, changing the weight of the drop package has an effect on the duration and peak acceleration of each of the described types of shock pulses. More specifically, increasing the weight of the drop package lengthens the duration and lowers the peak acceleration for each of the half sine, square wave and sawtooth pulses. The weight of the drop package can be adjusted by adding and removing weights (not shown) on the drop table.

*Modifications*

Figure 17:
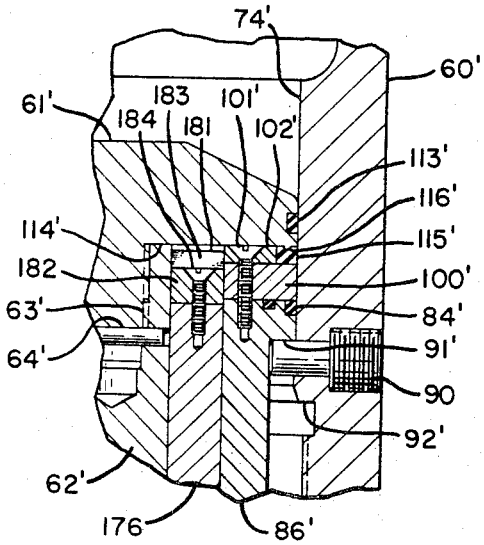
FIGURE 17 is an enlarged sectional view of a portion of FIGURE 15 showing the inner face of the closure the closure member.
Figure 15:
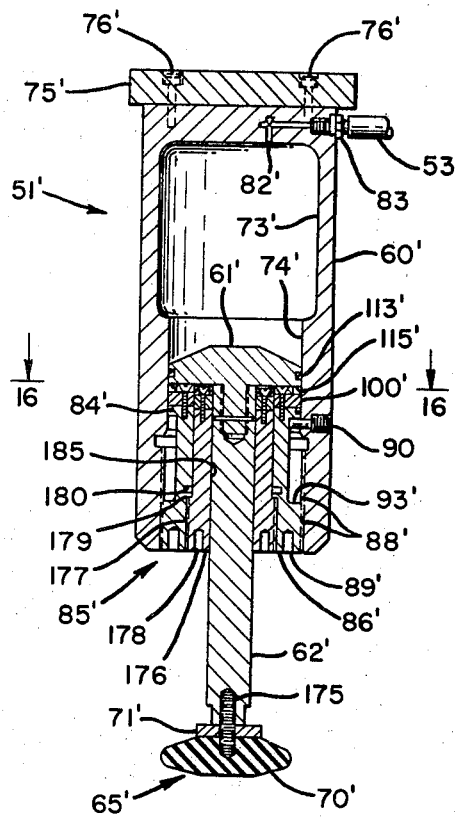
FIGURE 15 is a cross sectional view like FIGURE 2 but showing a modified construction for the end wall of a cylinder and piston programmer unit similar to the programmer unit of FIGURE 2.
Figure 16:
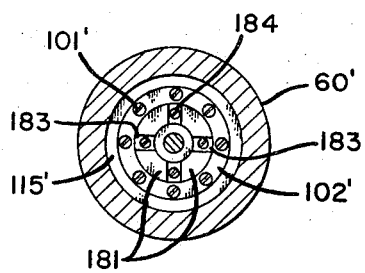
FIGURE 16 is a cross sectional view on the line 16—16 of FIGURE 15 showing the inner face of the closure member on the end of the cylinder.

FIGURES 15-17 show a cylinder and piston programmer 51' for performing all of the pulses described in connection with the cylinder programmer 51. The programmer 51' is a smaller, lighter duty version which operates in the same manner as described for programmer 51. The programmer 51' in FIGURE 15 is drawn to substantially the same scale as FIGURE 2. Aside from size, the main difference between programmers 51 and 51' is in the construction of the end wall structure. In order to simplify the description of programmer 51', parts which are obviously equivalent to similar parts in programmer 51 are marked with primed reference numbers, and parts which are changed are marked with new reference numbers. Parts which are identical even as to size are given the same unprimed reference numbers in FIGURE 15 as in FIGURE 2.

Programmer 51' comprises a metal cylinder 60' and a metal piston 61' received in the cylinder. A metal piston rod 62' is secured to the piston by means of threads 63' and a metal pin 64'. A circular impact head 65' is attached to the outer end of the piston rod 62'. The outer face of the impact head is made of a circular disk 70' of elastomer materials such as natural rubber. The elastomer disk 70' is bonded to a metal backing plate 71' and secured to the piston rod by means of a threaded rod 175.

The cylinder 60' has an inside wall portion 73' of relatively large diameter located in the upper part of the cylinder, and an adjacent wall portion 74' of smaller diameter. A metal mounting block 75' is secured to the upper end of the cylinder 60' by means of screws 76'. The upper end of the mounting block 75' is preferably rectangular so that at its four corners four mounting holes (not shown) can be provided. The upper end of the cylinder 60' is provided with an inlet passage 82' in which is threaded a conventional attachment fitting 83 for connecting the flexible high pressure line 53 to the inside of the cylinder.

The lower end of the cylinder is closed by an adjustable end wall structure 85'. The end wall structure comprises a circular metal member or block 86'. The end wall portion 86' is held in place by threads 88' so that by rotating the member 86' it can be moved inwardly and outwardly relative to the cylinder 60'. Wall portion 86' carries a hard rubber sealing ring 84'. In order to provide means for rotating the member 86', its outer face is provided with at least two bores 89' for cooperation with a spanner wrench. As shown in FIGURE 15 the end wall member 86' is in its outermost position. In order to fix the outermost position in a positive manner, an abutment screw 90 is threaded into the side of cylinder 60' and engages an abutment rim 91' on the inner end of the member 86'. In order to provide the maximum inner position of end wall member 86' in a positive manner, the inner wall of cylinder 60' is provided with an abutment rim 92' which will engage an abutment rim 93' on the wall member 86'.

The primary difference between programmers 51 and 51' relates to the plugs 96 of programmer 51. Instead of employing plugs 96, the programmer 51' employs a cylindrical sleeve 176 which is adjustably secured in wall member 86' by threads 177. The sleeve 176 is provided with at least two bores 178 for cooperation with a spanner wrench. In order to provide an inward stop for the sleeve 176, the sleeve is provided with an abutment shoulder 179 which cooperates with an abutment shoulder 180 on the wall member 86'. Instead of abutment means for fixing the outer position of sleeve 176, the sleeve is simply adjusted to be flush with the wall member 86' as shown in FIGURE 15. The inner end of sleeve 176 is provided with elastomer cushion means 181 which serves the same function as the cushion disks 107 in FIGURE 2. The cushion means 181 is preferably formed as a continuous ring which is bonded to a metal ring 182 and is then cut to provide four slots 183 to receive four attachment screws 184. The cushion means and the metal ring 182 are secured to sleeve 176 by the screws 184. The sleeve 176 is apertured at 185 to receive the piston rod 62', and the aperture is slightly oversized to provide the escape passage which was described in connection with the aperture 87 in FIGURE 2.

The relation between the piston 61' and the cylinder 60', and the relation between the piston and the end wall structure 85' will now be described. The rim of the piston is recessed to receive a sealing ring 113' of a material such as hard rubber so that the piston 61' has a gas-tight sliding seal in the small diameter portion 74' of the cylinder 60'. In addition to the peripheral seal 113', provision is also made for sealing the outer face 114' of the piston. The face seal comprises a sealing ring 115' of a material such as hard rubber bonded to a metal ring 100' which is attached to the end wall member 86' by means of screws 101' through an overlying metal ring 102'. In addition, the face 114' of the piston is provided with a small annular ridge 116' projecting downwardly to assure good contact with the sealing ring 115'.

The programmer 51' is operated exactly the same as described for programmer 51. For example, FIGURE 15 shows the programmer 51' adjusted for a half sine pulse because the piston 61' is in the small diameter portion 74' and the cushion ring 131 is retracted. When it is desired to move the cushion ring 131 inwardly to cushion the rebound of the piston for a square wave pulse, the sleeve 176 is screwed in until the shoulder 179 abuts the shoulder 180. When it is desired to move the piston 61' up into the large diameter cylinder portion 73' for a sawtooth pulse, the wall member 86' is screwed in until shoulder 93' engages the stop pin 90.

Figure 18:
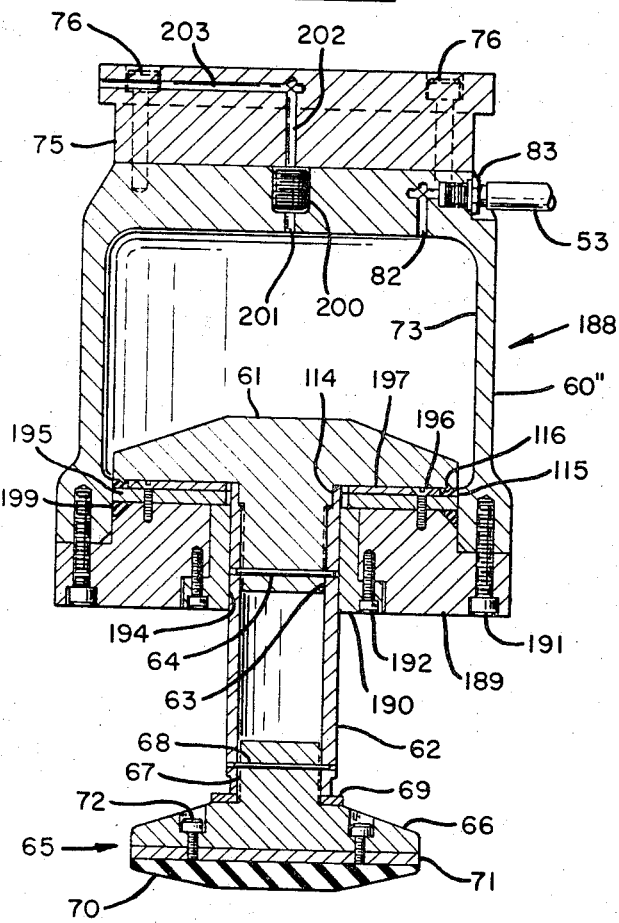
FIGURE 18 is a cross sectional view of the alternative embodiment of the cylinder and piston unit which provides a simplified construction that can program half sine and sawtooth pulses but not square wave type pulses.

FIGURE 18 shows the simplified cylinder and piston embodiment which can provide half sine and sawtooth pulses but not square wave type pulses. In FIGURE 18 the parts which are identical to parts in FIGURE 2 are given the same reference numbers. Parts which are similar to parts in FIGURE 2 are designated with double primed reference numbers, and parts which are entirely different are designated with new reference numbers.

FIGURE 18 shows a programmer 188 comprising a metal cylinder 60" which is shorter than cylinder 60. The piston 61 is secured to a piston rod 62 in the same way as in FIGURE 2, and the impact head 65 is constructed and attached to the piston rod 62 in the same way as in FIGURE 2. The cylinder 60" is substantially the same as cylinder 60 except at its lower end, and except that it has only the large diameter working portion 73 and no small diameter working portion.

The lower end of cylinder 60" is not adjustable and comprises annular members 189 and 190. Member 189 is attached to the end of cylinder 60" by screws 191, and the member 190 is attached to member 189 by screws 192. The end member 190 is apertured at 194 to receive the piston rod 62, and the aperture is slightly oversized to provide the escape passage which was described in connection with the aperture 87 in FIGURE 2. Programmer 188 includes the face sealing ring 115, and the sealing ridge 116 on the piston as shown in detail in FIGURE 5. In the programmer of FIGURE 18, the sealing ring 115 is bonded to a metal ring 195. The metal ring 195 is attached to the end member 189 by screws 196 which pass through an overlying metal ring 197. The dimensions are such that when the outer face 114 of the piston rests on metal ring 197, the sealing ridge 116 will project below the ring 197 and into the sealing ring 115 to form a gas-tight seal. This is the same arrangement as in the programmer 51. More specifically, when the plugs 96 are screwed outwardly as in FIGURE 12, the piston face 114 rest on the metal ring 102, and the sealing ridge 116 projects below ring 102 and into the sealing ring 115 to form a gas-tight seal.

In the programmer of FIGURE 18, the piston 61 does not require the peripheral sealing ring 113 of FIGURE 2 because the piston always operates in the large diameter portion 73 of cylinder 60". FIGURE 18 includes a sealing ring 199 which is fixed in place between metal ring 195 and the upper end of the end member 189. The sealing ring 199 is similar to ring 84 in FIGURE 2 but does not function as a sliding seal as in the case of ring 84.

The simplified programmer 188 of FIGURE 18 operates for half sine and sawtooth pulses in exactly the same manner as described in connection with programmer 51 when the programmer 51 is adjusted as shown in FIGURE 12. More specifically, when programmer 188 is charged with a gas pressure above the pressure which would permit breakaway of the face seal 115, 116, the piston 61 will remain locked in cylinder 60", and the elastomer programmer 52 will provide the spring curves and the half sine shock pulse curves shown in FIGURES 8 and 9, respectviely. When the programmer 188 is charged with a low enough gas pressure to permit breakaway of the face seal, the spring curves of FIGURE 13 will be obtained and will provide the sawtooth pulses of FIGURE 14.

FIGURE 18 shows a high pressure safety relieve arrangement which prevents the cylinder 60" from breaking in the event that the cylinder is inadvertently connected to a source of gas pressure substantially above the pressure for which the cylinder is designed to operate. The safety arrangement comprises a frangible metal burst plug 200 which normally closes a relief passageway from the inside of the cylinder to atmosphere. The relief passageway consists of a portion 201 in the upper end of the cylinder and portions 202 and 203 in the mounting block 75. In the event that overload gas pressure is inadvertently admitted to the cylinder, the plug 200 will burst and open the relief passageway. The safety relief arrangement is of course also usable with the programmers 51 and 51'.

Although specific details of the present invention are shown and described herein, it is to be understood that modifications may be made therein without departing from the spirit and scope of the invention as set forth in the appended claims.

What is claimed is:

1. The method of obtaining a sawtooth shock pulse comprising the steps of, placing between impacting masses a force limiting device in series with an elastomer programmer, said device being arranged to reduce a resisting force in response to a force applied thereto reaching a predetermined magnitude, employing said elastomer programmer to provide the rise leg of the sawtooth pulse, employing said forcing limiting device to provide the decay leg of the sawtooth pulse, and causing relative movement between said masses to produce an impact therebetween.

2. The method of obtaining half sine wave, square wave and sawtooth shock pulses comprising the steps of, placing between impacting masses an adjustable programming device in series with an elastomer programmer, causing relative movement between said masses to produce an impact therebetween, and at times adjusting said device to serve as a rigid locked unit throughout the shock pulse to produce the half sine wave, at other times adjusting said device to serve as a preloaded constant force spring whereby the rise portion of the square wave pulse is provided by the compression of the elastomer programmer, and the dwell portion of the square wave pulse is provided by the action of said device, and at still other times adjusting said device to reduce a resisting force in response to a force applied thereto reaching a predetermined magnitude to enable said elastomer programmer to program the rise leg of the sawtooth pulse and to enable said device to provide the decay leg of the sawtooth pulse in response to the predetermined force being reached through the compression of the elastomer programmer.

3. A shock programmer for use in forming half sine and sawtooth shock pulses of acceleration versus time comprising a cylinder, a piston in the cylinder, said piston being formed with an outer face, said cylinder having an inside wall portion of given diameter, the diameter of said piston being substantially less than that of said inside wall portion of given diameter to form a substantially free flow passage across the piston, said cylinder having an apertured end wall, and another end wall spaced from said apertured end wall, a piston rod attached to said piston to be actuated thereby and projecting through the aperture in said apertured end wall, a sealing ring disposed in sealing engagement between said apertured end wall and the outer face of said piston for forming a seal therebetween when said outer face of said piston and said apertured end wall are adjacent one another, said seal being broken after said outer face of said piston moves away from said apertured end wall, the inner diameter of said sealing ring being substantially greater than the outer diameter of said piston rod, the area between said piston outer face and said apertured end wall radially inward of said sealing ring being arranged to communicate with the outside of said cylinder by a restricted passage, a source of gas under adjustable pressure connected to said cylinder for supplying gas under pressure in said cylinder, and an elastomer programmer arranged to abut against said piston rod, whereby the pressure of said gas in said cylinder is adjusted to lock said piston with said cylinder to form a half sine shock pulse with said seal causing said gas to act only on the exposed surface of said piston in said cylinder to enable the half sine shock pulse to be programmed by said elastomer programmer, and whereby to form a sawtooth shock pulse, the gas in said cylinder is adjusted so that the compressive force of said elastomer programmer reaches the magnitude of the force of the gas in said cylinder acting on the exposed surface of said piston, said piston moves away from said seal to enable the gas in said cylinder to act against the outer face of said piston and gas in said cylinder is vented through said restricted passageway.

4. A shock programmer as claimed in claim 3 in which said outer face of the piston is closely adjacent said apertured end wall when said piston is in sealing engagement with said sealing ring whereby there is substantially no space between the piston and the apertured end wall.

5. A shock programmer as claimed in claim 3 for additionally forming square wave shock pulses of acceleration versus time, in which said end wall is adjustably connected to said cylinder for movement into and out of said cylinder, said cylinder having an inside wall portion of smaller diameter than said given diameter portion, said smaller diameter portion being located adjacent said apertured end wall, said piston being receivable in said smaller diameter portion when said apertured end wall is adjusted to an outward position, and a sliding seal between the periphery of said piston and said smaller diameter portion of the cylinder.

6. A shock programmer as claimed in claim 5 comprising stop means for fixing inner and outer positions of said apertured end wall, said inner position being such that when said piston engages said apertured end wall the piston is in said given diameter portion of said cylinder, and said outer position being such that when said piston engages said apertured end wall the piston is sealed in said smaller diameter portion of the cylinder.

7. A shock programmer as claimed in claim 5 further comprising cushion means between said apertured end wall and the outer face of the piston, and means for adjusting the position of said cushion means toward and away from the piston, the limits of said adjustment means being such as to cause said piston to seat on said sealing ring when said cushion means are adjusted away from the piston and such as to prevent said piston from seating on said sealing ring when said cushion means are adjusted toward the piston.

8. A shock programmer as claimed in claim 5 in combination with a source of adjustable gas pressure, and a flexible hose connecting said cylinder to said source of gas pressure.

9. A shock programmer as claimed in claim 3 wherein said restricted passageway is disposed between said apertured end wall and said piston rod.

10. Shock testing apparatus for forming a sawtooth shock pulse comprising a movable support for carrying a test specimen, a reaction mass, means for guiding said support for movement towards said reaction mass, shock programming means positioned between said movable support and reaction mass comprising a cylinder programmer with a cylinder, said cylinder having an apertured end wall and another end wall spaced from said apertured end wall, a piston and rod unit sealed in said cylinder end wall and projecting out of the aperture in said apertured end wall of the cylinder, an impact face on the outer end of said piston and rod unit, a piston of said piston and rod unit being formed with an outer face, a sealing ring disposed in sealing engagement between said apertured end wall of said cylinder and the outer face of said piston when said outer face of said piston and said apertured end wall are adjacent to one another, and the area between said outer face and said apertured end wall radially inward of said sealing ring being arranged to communicate with the outside of said cylinder by a restricted passageway to enable gas trapped radially inward of said sealing ring to escape, a source of gas under adjustable pressure connected to said cylinder for supplying gas under pressure in said cylinder, said programming means further comprising an elastomer programmer separate from said cylinder programmer, said elastomer programmer comprising at least one elastomer member, said elastomer programmer being positioned so that it will abut said impact face when said movable support moves towards the reaction mass, one of said cylinder and elastomer programmers being mounted on said movable support, and the other of said programmers being mounted on said reaction mass, whereby the pressure of said gas in said cylinder is adjusted to maintain the piston and rod unit in fixed position relative to said cylinder during the rise time of the sawtooth shock pulse to enable the elastomer programmer to program the rise portion of the sawtooth shock pulse.

11. Shock testing apparatus as claimed in claim 10 in which said cylinder has an inside wall portion of given diameter, the diameter of said piston being substantially less than that of said inside wall portion of given diameter to form a free flow passage across the piston, said piston being formed with an outer face, a sealing ring disposed in sealing engagement between said apertured end wall of the cylinder and the outer face of said piston when said outer face of said piston and said apertured end wall are adjacent one another, and the area between said outer face and said apertured end wall radially inward of said sealing ring being arranged to communicate with the outside of said cylinder by a restricted passage.

12. Shock testing apparatus as claimed in claim 11 in which said apertured end wall of the cylinder is adjustably connected to said cylinder for movement into and out of said cylinder, said cylinder having an inside wall portion of smaller diameter than said given diameter portion, said smaller diameter portion being located adjacent said end of the cylinder, said piston being receivable in said smaller diameter portion when said cylinder end is adjusted to an outward position, and a sliding seal between the periphery of said piston and said smaller diameter portion of the cylinder.

13. Shock testing apparatus as claimed in claim 12 comprising stop means for fixing inner and outer positions of said cylinder end, said inner position being such that when said piston engages said cylinder end the piston is in said given diameter portion of said cylinder, and said outer position being such that when said piston engages said cylinder end the piston is in said smaller diameter portion of the cylinder.

14. An adjustable cylinder and piston shock programmer for use in series with a programmer having a substantially straight line spring rate to provide a resultant half sine, sawtooth and square wave type pulses, said cylinder and piston programmer comprising a cylinder having a small diameter portion adjacent one end thereof and a larger diameter portion adjacent said small diameter portion, said cylinder being closed at one end, an end wall structure at another end of said cylinder, said end wall structure having a first member adjustably connected to said cylinder and a second member adjustably connected to said first member, a piston in said cylinder and having a fluid-tight sliding seal with said small diameter portion, said piston being formed with an outer face, a piston rod attached to said piston to be actuated thereby and projecting out of said cylinder through an aperture in one of said first and second end wall members, sealing ring means disposed in sealing engagement between said end wall structure and the outer face of said cylinder for forming a seal therebetween when said outer face of said piston and said end wall structure are adjacent one another, the inner diameter of said sealing ring means being substantially greater than the other diameter of said piston rod, said first end wall member being movable to position said piston either in said large diameter or small diameter portions of said cylinder, cushion means on the inner end of said second end wall member, said second end wall being movable relative to said first end wall member to support said piston either on said cushion means or on said first end wall member, and the area between said piston outer face and said end wall structure radially inward of said sealing ring being arranged to communicate with outside of said cylinder by a restricted passage, a source of gas under adjustable pressure connected to said cylinder for supplying gas under pressure in said cylinder, and an elastomer programmer arranged to abut against said piston rod, whereby the pressure of said gas in said cylinder is adjusted to prevent said piston from moving relative to said cylinder throughout the half sine shock pulse; whereby the pressure of said gas in said cylinder is also adjusted to prevent said piston from moving into said cylinder until the rise leg of the square-wave pulse programmed by the compression of said elastomer programmer, said pressure of said gas in said cylinder being low enough to permit said piston to stroke into said cylinder and provide the dwell portion of said square wave pulse when said elastomer programmer has been compressed by the impact with said cylinder and piston programmer, whereby said pressure of said gas in said cylinder is further adjusted to enable said elastomer programmer to program the rise leg of the sawtooth shock pulse and to enable said cylinder and piston programmer to program the decay leg of the sawtooth shock pulse.

15. An adjustable cylinder and piston programmer as claimed in claim 14 in which said first end wall member contains said aperture for the piston, and said second end wall member comprises a plurality of plugs threaded in bores in said first end wall member.

16. An adjustable cylinder and piston programmer as claimed in claim 14 in which said first end wall member is cylindrical, said second end wall member is a sleeve threaded in said first member, and said second end wall member contains said aperture for the piston.

17. An adjustable cylinder and piston shock programmer as claimed in claim 14 wherein said restricted passageway is disposed between said apertured end wall and said piston rod.

18. A cylinder and piston shock programmer for use in series with a programmer having a substantially straight line spring rate to provide a resultant sawtooth shock pulse; said cylinder and piston programmer comprising a cylinder having an apertured end wall, a piston in said cylinder, a piston rod attached to the outer end of said piston and received in said aperture in the end wall for movement in and out of the cylinder, said cylinder being filled with gas at substantially greater than atmospheric pressure, said cylinder and piston comprising cooperating gas tight means preventing inward movement of said piston until the inward force on the piston is greater than the outward force of said gas pressure acting on the inner face of the piston to enable said programmer having a substantially straight line spring rate to program the rise portion of said sawtooth shock pulse, and means to permit flow of gas around the piston upon causing initial inward movement of said piston to reduce outward force on the piston to the force of said gas pressure acting on the cross section area of said piston rod, thus producing the decay portion of the sawtooth shock pulse.

19. In a cylinder and piston shock programmer for use in series with a programmer having a substantially straight line spring rate to provide a resultant sawtooth shock pulse; said cylinder and piston programmer comprising a cylinder having an apertured end wall, a piston in said cylinder, a piston rod attached to the outer end of said piston and received in said aperture in the end wall for movement in and out of the cylinder, means forming a free gas flow passage across said piston, means for supplying said cylinder with gas under pressure, and gas tight means sealing said passage until the instant the piston moves into the cylinder and then opening said passage to produce the decay portion of the sawtooth shock pulse.

References Cited

UNITED STATES PATENTS

| | | | |
|---|---|---|---|
| 1,261,011 | 4/1918 | Cook | 188—88.1 |
| 2,695,777 | 11/1954 | Garrison et al. | 188—96.6 |
| 3,209,580 | 10/1965 | Colby | 73—12 |
| 3,226,974 | 1/1966 | Bresk et al. | 73—12 |
| 3,228,672 | 1/1966 | Bresk et al. | 73—12 |

FOREIGN PATENTS 13,997   6/1913   Great Britain.

OTHER REFERENCES

Morrow, C. T., Sargent, H. J., Sawtooth Shock as a Component Test, Jour. of the Acoustical Soc. of Am., vol. 28, #5, September 1956, pages 959–965.

RICHARD C. QUEISSER, *Primary Examiner.*

JAMES H. WILLIAMSON, *Assistant Examiner.*